US008264699B2

(12) United States Patent
Saikawa et al.

(10) Patent No.: US 8,264,699 B2
(45) Date of Patent: Sep. 11, 2012

(54) APPARATUS AND METHODS FOR CONVERTING PRINT DATA SUPPLIED FROM A HOST COMPUTER TO A PRINT MEDIA PROCESSING APPARATUS INTO PRINT IMAGE DATA BEFORE A PRINT COMMAND IS ASSERTED

(75) Inventors: Takashi Saikawa, Shiojiri (JP); Atsushi Natsuno, Matsumoto (JP); Yoshiaki Kinoshita, Hata-machi (JP); Masanori Hayashi, Nagaua-machi (JP)

(73) Assignee: Seiko Epson Corporation, Tokyo (JP)

( * ) Notice: Subject to any disclaimer, the term of this patent is extended or adjusted under 35 U.S.C. 154(b) by 1341 days.

(21) Appl. No.: 11/787,131

(22) Filed: Apr. 13, 2007

(65) Prior Publication Data

US 2007/0242307 A1 Oct. 18, 2007

(30) Foreign Application Priority Data

Apr. 13, 2006 (JP) ................................. 2006-111052

(51) Int. Cl.
*G06F 3/12* (2006.01)
*G06K 15/00* (2006.01)

(52) U.S. Cl. ...................................... 358/1.13; 358/1.16

(58) Field of Classification Search ......................... None
See application file for complete search history.

(56) References Cited

U.S. PATENT DOCUMENTS 6,257,783 B1 7/2001 Hanaoka et al.
6,646,764 B1 * 11/2003 Wataya ........................ 358/3.28
6,885,471 B1 * 4/2005 Minowa et al. ............. 358/1.15
7,056,047 B2 6/2006 Sasaki et al.
7,090,131 B2 8/2006 Natsuno
7,584,148 B2 * 9/2009 Omura et al. ................... 705/45
7,609,394 B2 * 10/2009 Hosoi ............................ 358/1.1
2001/0024585 A1 * 9/2001 Koakutsu et al. ............... 400/76
2003/0126081 A1 * 7/2003 Ono ............................... 705/42
2006/0055973 A1 3/2006 Saikawa
2006/0198683 A1 9/2006 Sasaki et al.
2006/0231621 A1 10/2006 Natsuno

FOREIGN PATENT DOCUMENTS

JP 11-138938 A 5/1989
JP 11-232065 A 5/1989
JP 11-292324 A 5/1989
JP 05-212916 8/1993
JP 06-004231 1/1994
JP 06-115220 A 4/1994
JP 07-178970 7/1995
JP 09-263356 A 7/1997
JP 10-217551 8/1998
JP 2001-026158 1/2001
JP 2000-344428 A 8/2001

(Continued)

*Primary Examiner* — Gabriel Garcia

(74) *Attorney, Agent, or Firm* — Nutter McClennen & Fish LLP; John J. Penny, Jr.; Michael P. Visconti, III

(57) ABSTRACT

A control method for a print media processing apparatus that prints on a print medium based on print data supplied from a host computer, comprising converting the print data supplied from the host computer to the print media processing apparatus before a print command is asserted to print image data in a buffer based on a print data conversion command, and controlling printing in response to a print command by accessing the buffer and retrieving the print image data.

9 Claims, 15 Drawing Sheets

FOREIGN PATENT DOCUMENTS

| | | | |
|---|---|---|---|
| JP | 2004-243764 | | 9/2004 |
| JP | 2004-243766 | | 9/2004 |
| JP | 2005-144995 | | 6/2005 |
| JP | 2005-229514 | | 8/2005 |
| JP | 2006-88688 | | 4/2006 |
| JP | 2005-329679 | A | 8/2006 |

* cited by examiner

OUTPUT BUFFER
A B C .

A B C .

STATIC DATA STORAGE AREA
A B C D E
B A N K .
COPY
A B C D E
B A N K .

A B C 0 0 0 1 1 D E
B A N K

COPY
A B C D E
B A N K .

A B C 0 0 0 1 2 D E
B A N K .

OUTPUT BUFFER

| | | | | | | | | | |
|---|---|---|---|---|---|---|---|---|---|
| A | B | C | 0 | 0 | 0 | 1 | 1 | D | E |
| B | A | N | K | | | | | | |
| | | | | | | | | | |

FIG.12A

| | | | | | | | | | |
|---|---|---|---|---|---|---|---|---|---|
| A | B | C | 0 | 0 | 0 | 1 | 2 | D | E |
| B | A | N | K | | | | | | |
| | | | | | | | | | |

FIG.12B

| | | | | | | | | | |
|---|---|---|---|---|---|---|---|---|---|
| A | B | C | 0 | 0 | 0 | 1 | 3 | D | E |
| B | A | N | K | | | | | | |
| | | | | | | | | | |

FIG.12C

| | | | | | | | | | |
|---|---|---|---|---|---|---|---|---|---|
| A | B | C | 0 | 0 | 0 | 1 | 4 | D | E |
| B | A | N | K | | | | | | |
| | | | | | | | | | |

FIG.12D

| | | | | | | | | | |
|---|---|---|---|---|---|---|---|---|---|
| A | B | C | 0 | 0 | 0 | 1 | 5 | D | E |
| B | A | N | K | | | | | | |
| | | | | | | | | | |

FIG.12E

APPARATUS AND METHODS FOR CONVERTING PRINT DATA SUPPLIED FROM A HOST COMPUTER TO A PRINT MEDIA PROCESSING APPARATUS INTO PRINT IMAGE DATA BEFORE A PRINT COMMAND IS ASSERTED

BACKGROUND OF THE INVENTION

1. Technical Field

The present invention relates to a control method for a print media processing apparatus having a plurality of functions for reading information recorded in magnetic ink on and for printing on print media, and relates to a print media processing apparatus.

2. Related Art

Print media processing apparatuses for reading information printed on a personal or business check or other type of slip or printing on a slip while conveying the slip through a transportation path are known from the literature. See, for example, Japanese Unexamined Patent Appl. Pub. JP-A-2001-026158, Japanese Unexamined Patent Appl. Pub. JP-A-2006-88688, and Japanese Unexamined Patent Appl. Pub. JP-A-2005-144995. As taught in Japanese Unexamined Patent Appl. Pub. JP-A-2005-229514, this type of print media processing apparatus may also have a roll paper printing unit for printing on roll paper or other type of continuous print medium to issue sales receipts, event tickets, coupons, and other types of ticket forms, and a slip printing unit for printing on slips such as personal or business checks while conveying the slip through the transportation path, thus rendering a hybrid print media processing apparatus that combines a continuous medium printing function and a slip printing function with the ability to read magnetic ink characters and images printed on the slip form.

A magnetic ink character reader (MICR) is generally used to read magnetic ink characters, and an image scanner is commonly used for imaging the media. These reading devices are disposed facing the transportation path to read the content of interest as the print medium travels passed the reading position of the reading device (image scanner or MICR device). A print head is also disposed to the transportation path for printing to the print medium after the reading process is completed.

Important information such as the checking account number and check amount is printed in magnetic ink at a predefined location on the face of slips such as checks, and whether the check is valid can be confirmed by reading and referencing the magnetic ink character information. As a result, Japanese Unexamined Patent Appl. Pub. JP-A-2004-243764 (pages 5-14, FIG. 5) and Japanese Unexamined Patent Appl. Pub. JP-A-2004-243766, for example, teach print media processing apparatuses that execute a printing process based on the magnetic ink character information read by the MICR, or more specifically whether the check is determined valid based on the magnetic ink character information. This enables running the printing process if the check is valid, and discharging the check if the check is invalid, for example. In a conventional print media processing apparatus of this type, the print data for printing on the check after the reading process is stored in a print buffer, and the print mechanism is controlled to execute a printing process based on the buffered print data.

FIG. 14 is a control block diagram of a print media processing apparatus according to the related art. The host computer 110 has a control unit 111 that controls overall operation of the print media processing apparatus.

The print media processing apparatus has a print mechanism 15, a CPU 101, RAM 102, flash ROM 103, a print control unit 105, and a communication interface 109.

The print control unit 105 includes a conversion unit **105*a* for producing the print data. The RAM 102 functions as a receive buffer for temporarily storing the received print data, and as a conversion buffer for storing the image data that is read for printing by the print mechanism 15. The conversion unit 105*a* reads and converts the print data from the receive buffer in the RAM 102 to image data for printing, and stores this print image data to an output buffer in RAM 102. The print mechanism 15** includes a print head and carriage, and prints on the print media.

FIG. 15 is a flow chart of the printing operation in this print media processing apparatus according to the related art. When check printing starts (step S51) in an application that first determines check validity using a magnetic ink character reading apparatus (not shown in the figure) included in the print media processing apparatus and determines whether to print the check based on whether the check is valid, the host computer 110 sends print data and a command to start printing to the print media processing apparatus (step S52).

The received print data is then temporarily stored in a receive buffer in RAM 102 in the print media processing apparatus (step S53). The conversion unit **105*a* reads the data to be printed from the receive buffer and converts this print data to print image data (step S54), and writes the print image data to the output buffer (step S55**). This image data is temporarily stored in the output buffer.

Printing starts when the print image data for one pass in the main scanning direction has been written to the output buffer. The print image data is therefore read from the output buffer (step S56) and printed by the print mechanism 15 (step S57). This process repeats until printing all print data is completed.

In this arrangement, the host computer sends print data with a print start command, and the printer converts the print data to image data for printing and writes the print image data to the output buffer each time the print start command is received. The process executed by this print media processing apparatus also assumes that the reading process and the printing process are executed for each slip one by one. More particularly, this arrangement does not anticipate continuously reading and processing a plurality of slips.

When this print media processing apparatus is caused to continuously read and process a plurality of slips, print data is received from the host computer 110 and temporarily stored in the receive buffer each time one slip is read, the print data is read from the receive buffer, converted to the print image data, and written to the output buffer to execute the printing process. This does not afford smoothly processing a plurality of slips.

Methods of accelerating the process of storing the print image data to the output buffer are also known from the literature. Japanese Unexamined Patent Appl. Pub. JP-A-H5-212916, for example, teaches a printer that internally converts print data sent from the host computer to bitmap image data and outputs and stores the converted bitmap image data in an external storage device in a file format. The printer can then directly read the bitmap image data from the external storage device for printing without again converting data to bitmap image data, and thereby shortens the printing time.

Japanese Unexamined Patent Appl. Pub. JP-A-H6-4231 teaches a printer that separates character data in a compressed format into a predefined first character data group and another second character data group, stores the character data groups in a first character data storage unit, and expands and stores all character data for the first character data group to a second character data storage unit when the printer power turns on. When a print command is then received, the printer reads and prints the character data from the second character data storage unit if the character data to be printed is character data belonging to the first character data group. This eliminates the need to convert characters in the first character data group, which contains frequently occurring characters, each time a job is printed, and thus greatly improves the overall effective printing speed of the printer.

See also Japanese Unexamined Patent Appl. Pub. JP-A-H10-217551.

When only certain print data is used in a particular application, such as printing on checks or other slips, sending the print data from the host computer and converting the print data to bitmap image data for every print job before printing starts causes a significant loss of time. This time loss is particularly apparent when continuously processing a plurality of slips. Even if the technology taught in Japanese Unexamined Patent Appl. Pub. JP-A-H6-4231 is used, the bitmap image data must be read from the output buffer each time a slip is scanned, and the speed increase that can be achieved when continuously processing multiple forms is therefore limited.

SUMMARY

The present invention enables further increasing the printing process speed.

A preferred aspect of at least one embodiment of the invention is a control method for a print media processing apparatus that prints on a print medium based on print data supplied from a host computer that outputs the print data, the control method having a print data conversion step of converting the print data supplied from the host computer to the print media processing apparatus before a print command is asserted to print image data in a buffer based on a print data conversion command; and a printing control step of controlling printing in response to a print command by accessing the buffer and retrieving the print image data.

Another aspect of at least one embodiment of the invention is a print media processing apparatus for printing on a print medium based on print data supplied from a host computer that outputs the print data, the print media processing apparatus including: a print data conversion unit for converting the print data supplied from the host computer to the print media processing apparatus before a print command is asserted to print image data in a buffer based on a print data conversion command; and a printing control unit for accessing the buffer and retrieving the print image data in response to a print command.

Because the print data is converted and written to the buffer before the print command is received, there is no image data to convert for printing after the printing process starts, and the printing process is fast. Converting the print data for printing to the print medium can also be controlled by a print data conversion command sent separately from the print command.

The control method for a print media processing apparatus according to another aspect of at least one embodiment of the invention preferably also has a printing step of printing by discharging ink from a stationary print head while conveying the print medium passed the print head.

The print media processing apparatus according to another aspect of at least one embodiment of the invention preferably also has a printing unit for printing by discharging ink from a stationary print head while conveying the print medium passed the print head.

These aspects of the invention convey the print medium through the transportation path without stopping even during the printing process, and thus afford a faster printing process compared with stopping the print medium at the printing position and moving the carriage to print.

Further preferably, the print media processing apparatus of at least one embodiment of the invention has a transportation means for conveying the print medium through a transportation path, a reading device disposed facing the transportation path for reading information on the print medium, and the reading device captures only the image information from the image information and magnetic ink character information of the print medium when a process for reading only image information on the print medium is specified.

This aspect of the invention enables selecting and reading only the image information from a print medium on which both image information and magnetic ink character information are printed. This arrangement enables reading only the image information if reading the magnetic ink characters is not necessary, and thus shortens the reading process time because it is not necessary to send the read data to the host computer or evaluate the result of the reading process.

Yet further preferably, the method of at least one embodiment of the invention also has a continuous reading and printing step of continuously reading information on the print medium from a plurality of print media and printing the print image data produced in the print data conversion step to each of the plural print media when a read command is received from the host computer.

The print media processing apparatus according to another aspect of at least one embodiment of the invention also has a reading control unit for controlling the reading process of the reading device. When a read command is received from the host computer, the reading control unit continuously reads information on the print medium from a plurality of print media, the printing control unit retrieves the previously converted print image data, and the printing unit prints the image data to each of the plural print media.

When a read command is received from the host computer, information is read continuously from plural print media, and the converted image data is printed on each of the plural print media. The invention thus increases the overall processing speed compared with printing after verifying whether the information on each print medium was read correctly. In addition, because image data written to the buffer is printed on the plural print media in conjunction with the reading process, the print data does not need to be converted for each processed slip and plural print media can be processed more quickly.

In the control method for a print media processing apparatus according to another aspect of at least one embodiment of the invention the image data includes a static data portion that is printed on all of the plural print media, and a variable data portion that varies on each of the plural print media; plural different print data combining the static data portion with the variable data portion are stored to the buffer in response to the print data conversion command; and the plural different print data are sequentially printed in the printing step.

In the print media processing apparatus according to another aspect of at least one embodiment of the invention, the image data includes a static data portion that is printed on all of the plural print media, and a variable data portion that varies on each of the plural print media; the print data conversion unit stores in the buffer plural different print data combining the static data portion with the variable data portion in response to the print data conversion command; and the printing unit sequentially prints the plural different print data.

The image data in this aspect of the invention has a static data portion and a variable data portion. Unique content can be printed to each print medium by changing only the variable data portion for each print medium. By dividing a single block of image data into a static data portion that does not change and a variable data portion that changes, the position to which the variable data portion is written does not need to be restricted to an area other than where the static data portion is printed. The variable data can therefore be written to the same place in the print image data regardless of the content of the variable data.

The print media processing apparatus according to another aspect of the invention has a static data storage area for storing the converted static data portion in the buffer; wherein the printing control unit reads the static data portion stored in the static data storage area and adds the variable data portion to the static data portion to regenerate the print image data each time the printing unit prints the image data.

Each time image data is printed on the print medium in these aspects of the invention, the static data stored in the static data storage area is read, the variable data portion is added to the static data portion, and the image data is regenerated. More specifically, when printing the image data on one print medium ends, the static data portion stored in the static data storage area is read, the static data portion is overwritten to the image data in memory, the variable data is added to the static data portion, and the new image data to be printed on the next print medium is created. As a result, if multiple print media are read by a single read command and different image data is printed on each print medium, the invention can be deployed in a print media processing apparatus having a buffer with minimal storage capacity because the area where the image data is stored only needs capacity sufficient to store the image data for one print medium.

In the control method for a print media processing apparatus according to another aspect of at least one embodiment of the invention, the variable data portion is a count, at least one setting from a group of settings including the initial value of the count, the number of digits in the count, and the count increment or decrement is set, and the count is converted based on the settings.

In the print media processing apparatus according to another aspect of at least one embodiment of the invention, the variable data portion is a count; at least one setting from a group of settings including the initial value of the count, the number of digits in the count, and the count increment or decrement is set; and the print data conversion unit converts the count based on these settings.

This arrangement enables controlling at least one setting from a group of settings including the initial value of the count, the number of digits in the count, and the count increment or decrement setting. The counter can therefore be freely controlled. Furthermore, because a conversion area equal in size to the number of digits in the count is reserved for the variable data portion, the static data portion and the variable data portion will not overlap when printed. The same print format can also be applied to all of the plurality of print media read by a single read command, and superior print quality can be achieved.

Yet further preferably, the control method for a print media processing apparatus according to another aspect of at least one embodiment of the invention converts the count based on the conversion method selected from a group including right justification in which space characters are added to the left of the count, zero fill in which zeroes fill the digits to the left of the count, and left justification which shifts the count to the left.

In the print media processing apparatus according to another aspect of at least one embodiment of the invention, the print data conversion unit converts the count based on the conversion method selected from a group including right justification in which space characters are added to the left of the count, zero fill in which zeroes fill the digits to the left of the count, and left justification which shifts the count to the left.

This arrangement enables setting the display format of the printed count. More specifically, the display format can be set to right justified, zero fill, or left justified. The format of the count can therefore be specified as desired by the user application.

The print media processing apparatus according to another aspect of at least one embodiment of the invention also has a means for supplying the print medium as previously specified when an error occurs.

Yet further preferably, the print media processing apparatus according to another aspect of at least one embodiment of the invention has a means for interrupting discharging the print medium parallel to supplying a print medium when an appropriate command is received from the host computer.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 12 is a transition diagram showing another example of writing the endorsement print data to the output buffer.

DESCRIPTION OF EMBODIMENTS

Preferred embodiments of the present invention are described below with reference to the accompanying figures.

Figure 1:
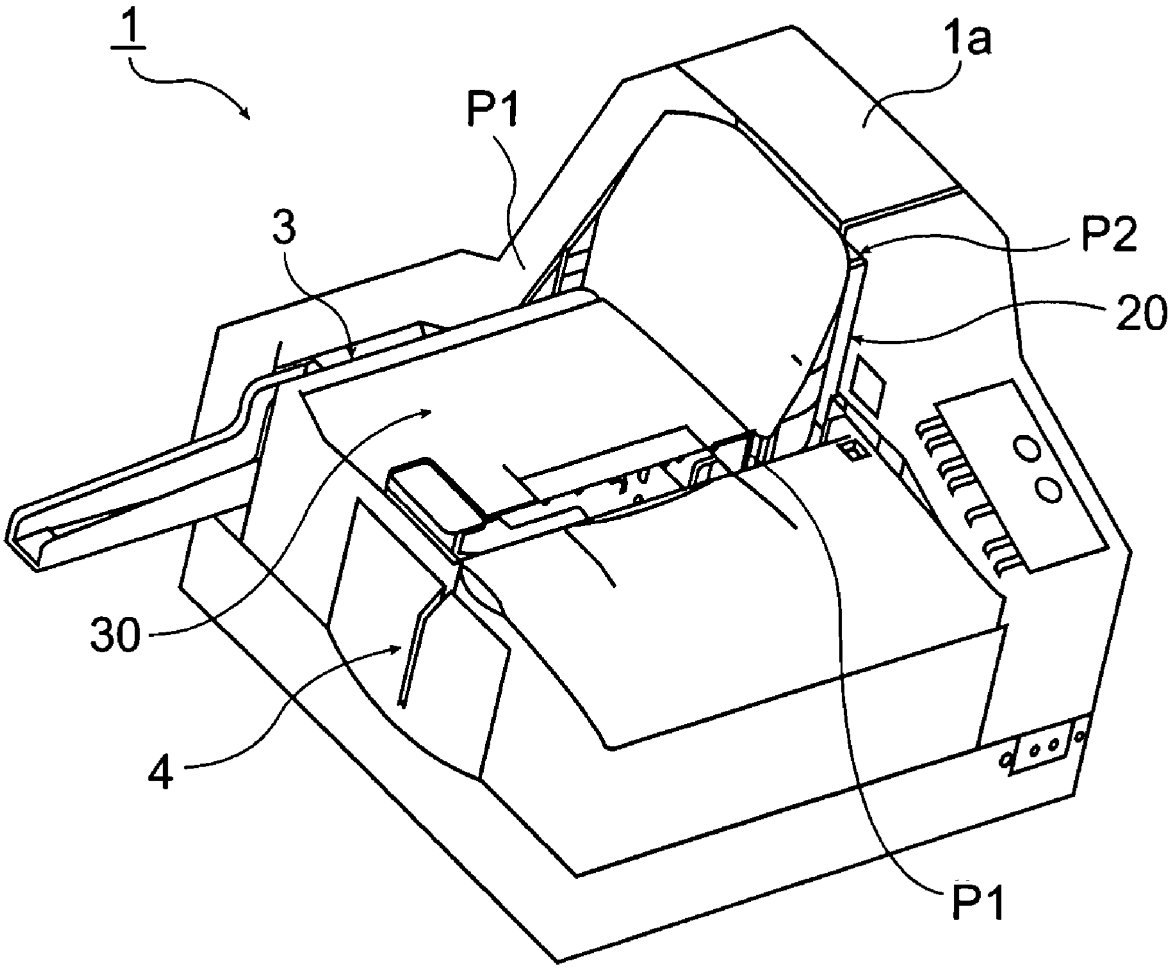
FIG. 1 is an oblique view of a print media processing apparatus according to a preferred embodiment of the invention.
Figure 2:
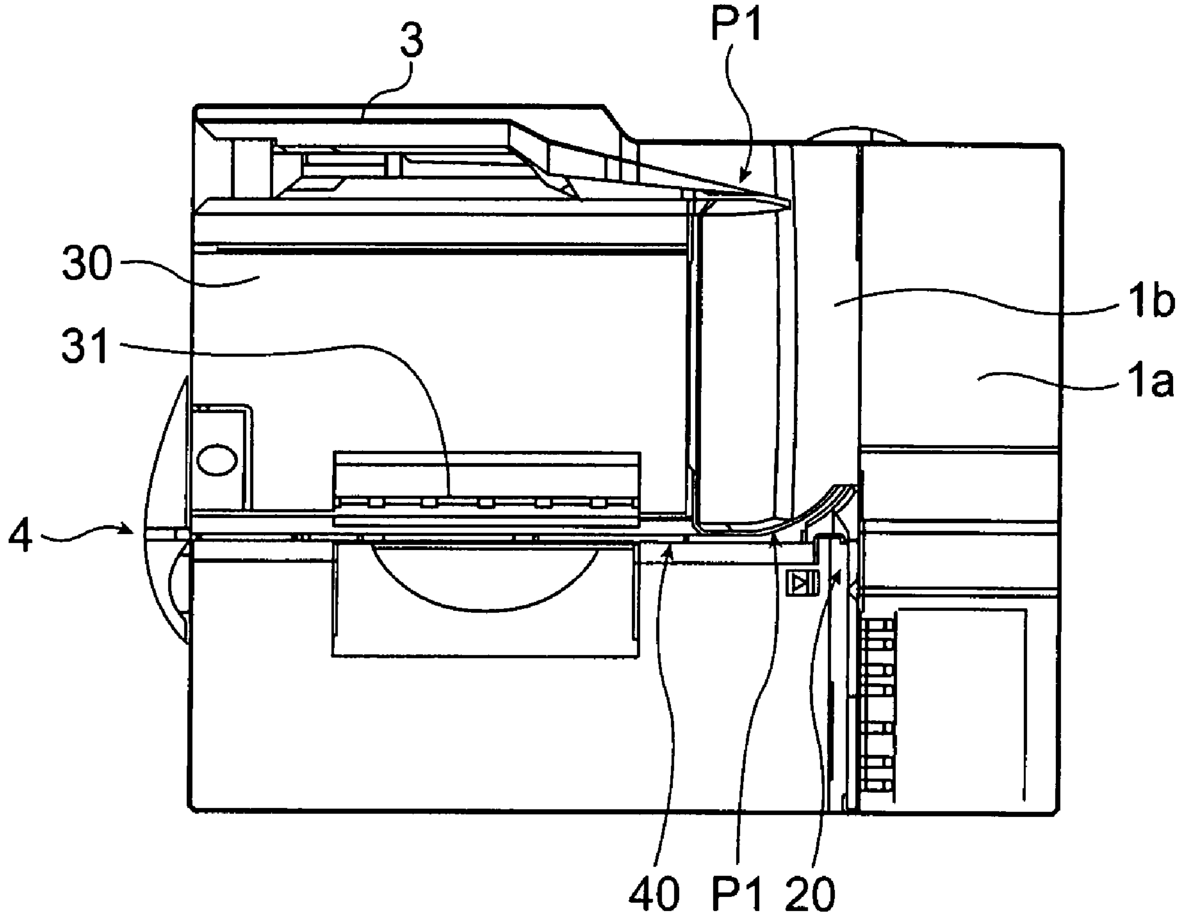
FIG. 2 is a top view of the print media processing apparatus shown in FIG. 1.
Figure 3:
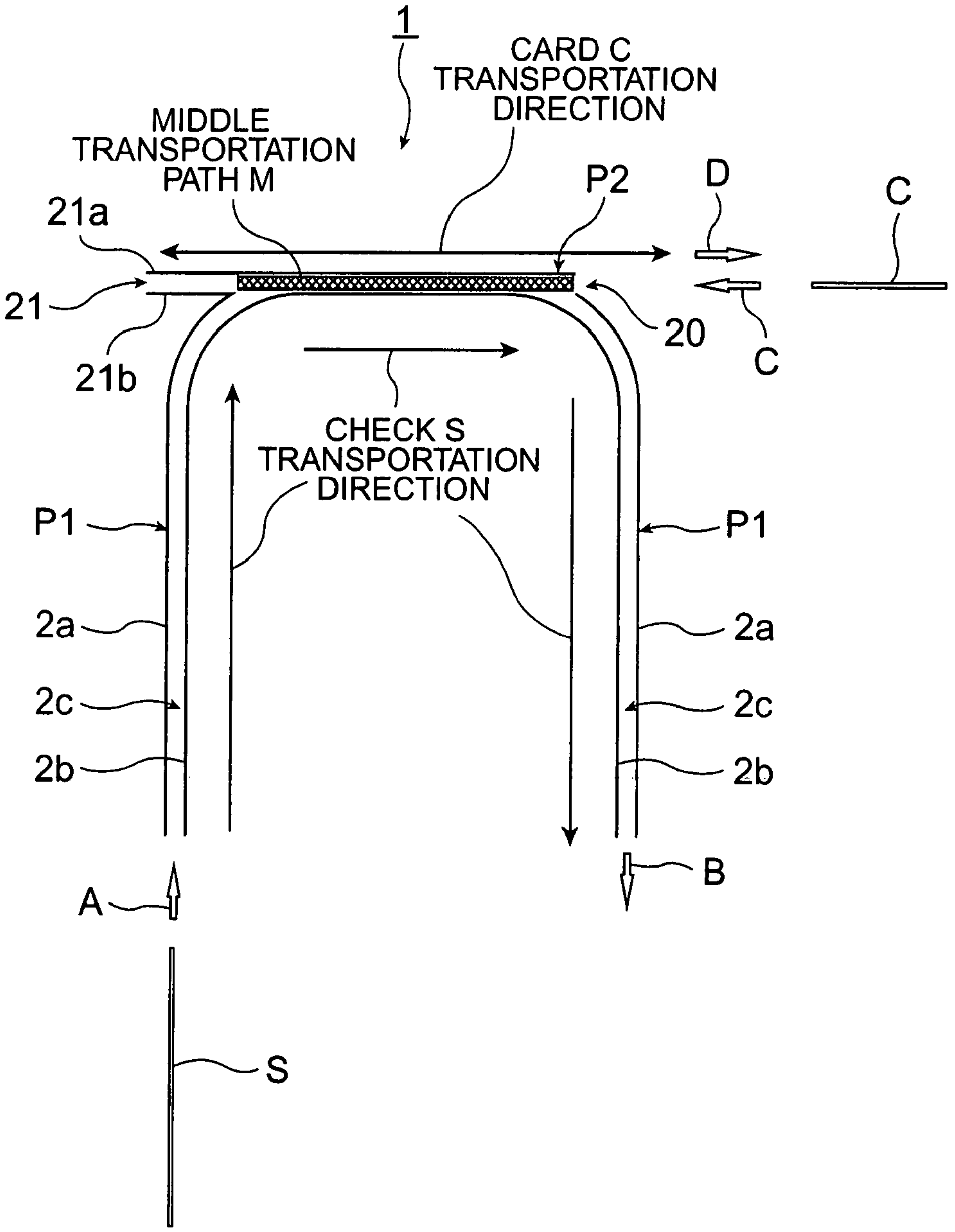
FIG. 3 is a schematic diagram showing the paper transportation path in the print media processing apparatus shown in FIG. 1.
Figure 4:
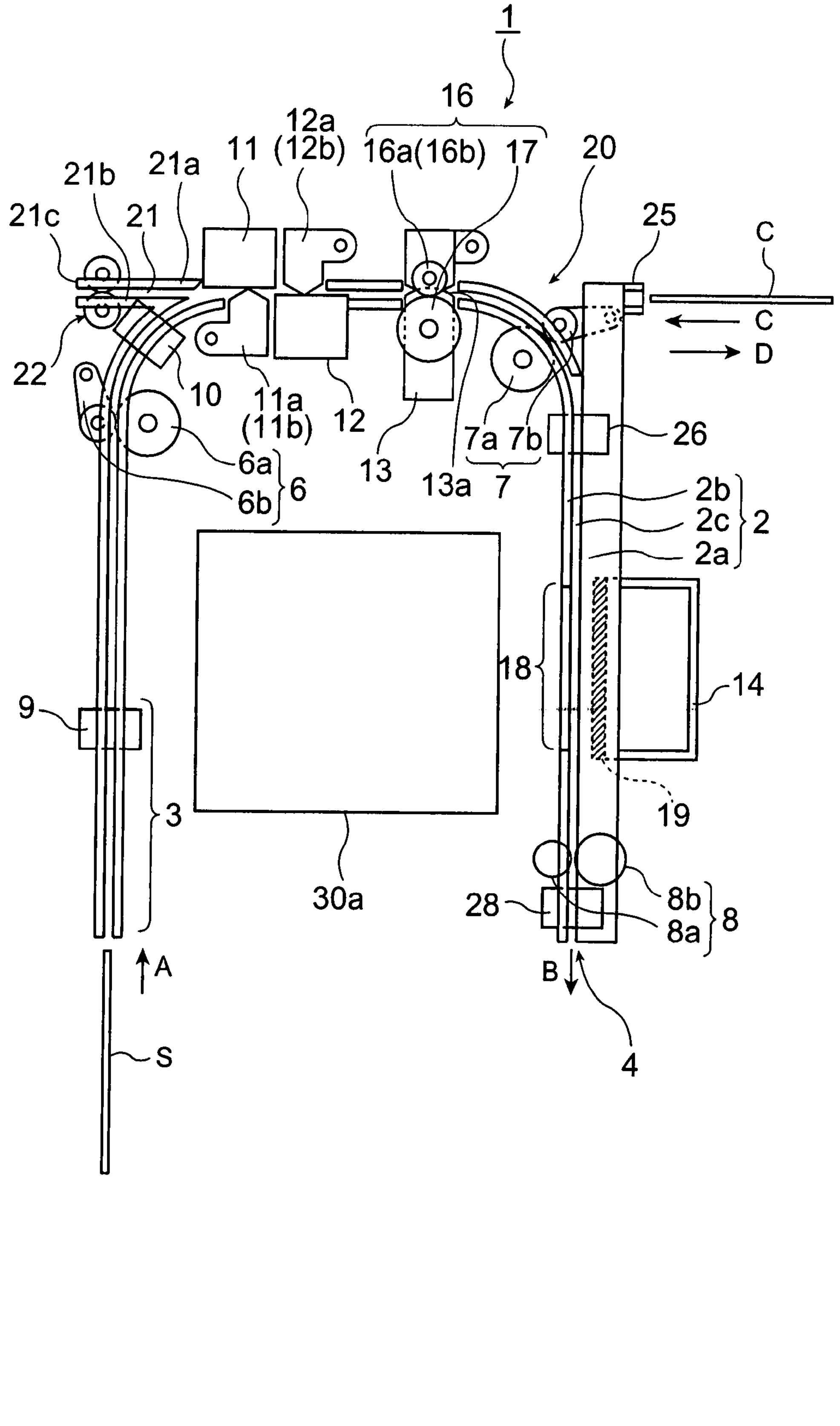
FIG. 4 is a schematic top view showing the internal arrangement of the print media processing apparatus shown in FIG. 1.

FIG. 1 is an oblique view of a print media processing apparatus according to a preferred embodiment of the invention, FIG. 2 is a top view of the print media processing apparatus shown in FIG. 1, FIG. 3 is a schematic diagram showing the paper transportation path in the print media processing apparatus shown in FIG. 1, and FIG. 4 is a schematic top view showing the internal arrangement of the print media processing apparatus shown in FIG. 1.

As shown in FIG. 1 to FIG. 4, the print media processing apparatus 1 according to this embodiment of the invention can read both sides of a check S, read magnetic ink characters from the check S, and print an endorsement on the check S as checks S loaded in an automatic sheet feeder (ASF) 3 (paper supply unit) are conveyed through a paper transportation path P1 that is formed in the printer case 1*a*.

The print media processing apparatus 1 can also read both sides of a card C that is inserted from a card insertion slot 20 as the card C is conveyed through a second paper transportation path P2 that is also rendered in the printer case 1*a*.

The print media processing apparatus 1 also has a roll paper compartment 30*a* (see FIG. 4) for holding the roll paper below a roll paper cover 30 provided in the printer case 1*a* inside the middle of the paper transportation path P1. A carriage 14 can print on the roll paper stored in the roll paper compartment 30*a*. The printed roll paper is then discharged from the print media processing apparatus 1 through the roll paper exit 31 (see FIG. 2).

A validation slip insertion slot 40 is rendered above the straight portion on the downstream side of the paper transportation path P1 as shown in FIG. 2 so that validation slips can be inserted. The print media processing apparatus 1 can also print on these validation slips.

The print media processing apparatus 1 in this embodiment of the invention is thus a multifunction hybrid printer that has an image scanner function, a magnetic ink character reader function, and printing functions for printing on checks S, roll paper, and validation slips.

As shown in FIG. 3, the paper transportation path P1 for conveying the checks S is substantially U-shaped, and the paper transportation path P2 for conveying cards C is straight so that stiff cards C can be conveyed. The paper transportation path P1 and the paper transportation path P2 share the portion of the paper transportation path P1 that is at the bottom of the U between the two straight legs of the U shape. This common part of the transportation path is referred to herein as the middle transportation path M.

The reading devices are disposed in this middle transportation path M. As shown in FIG. 2, the portion of the paper transportation path P1 that is above the middle transportation path M is covered by a transportation path cover 1*b* that is part of the printer case 1*a*. This transportation path cover 1*b* covers and thus protects the reading devices that are disposed to the middle transportation path M from the outside.

As shown in FIG. 3, the paper transportation path P1 has a transportation channel 2*c* rendered between an outside guide 2*a* and an inside guide 2*b*, and the checks S are conveyed through the transportation channel 2*c*. As shown in FIG. 2 and FIG. 4, the ASF 3 for stocking a plurality of checks S is disposed on the upstream side of the paper transportation path P1. The checks S are inserted to the paper transportation path P1 from the ASF 3 in the direction of arrow A in FIG. 4, and the multiple checks S stocked in the ASF 3 are separated and fed one by one into the paper transportation path P1.

The transportation means disposed in the paper transportation path P1 for conveying the checks S includes paper transportation rollers 6 on the upstream side of the middle transportation path M, middle transportation rollers 16 disposed in the middle transportation path M, second transportation rollers 7 located on the downstream side of the middle transportation path M, and discharge rollers 8 before the paper exit 4.

The paper transportation rollers 6 include a drive roller 6*a* on one side of the paper transportation path P1 and a pressure roller 6*b* disposed on the other side of the paper transportation path P1 opposite the drive roller 6*a*.

The second transportation rollers 7 include a drive roller 7*a* on one side of the paper transportation path P1 and a pressure roller 7*b* disposed on the other side of the paper transportation path P1 opposite the drive roller 7*a*.

As shown in FIG. 4, the middle transportation rollers 16 include a bottom pressure roller 16*a* disposed at the lower part of the paper transportation path P1, an upper pressure roller 16*b* disposed at the upper part of the paper transportation path P1, and a drive roller 17 opposing the bottom pressure roller 16*a* and upper pressure roller 16*b* from the other side of the middle transportation path M.

A check S fed into the paper transportation path P1 by the ASF 3 is conveyed through the middle transportation path M by the paper transportation rollers 6, the middle transportation rollers 16, and the second transportation rollers 7, and is then discharged in the direction of arrow B from the paper exit 4 by the discharge rollers 8.

If the width (height) of a check S is shorter than a predetermined amount, the upper pressure roller 16*b* and the drive roller 17 in the middle transportation roller 16 assembly are used to convey the check S. If the width (height) of the check S is greater than or equal to this predetermined amount, the bottom pressure roller 16*a*, the upper pressure roller 16*b*, and the drive roller 17 of the middle transportation roller 16 assembly convey the check S.

As shown in FIG. 3 and FIG. 4, the paper transportation path P2 includes the middle transportation path M and the card insertion slot 20 and card reversing path 21 that communicate with the opposite ends of the middle transportation path M. A card C conveyed into the middle transportation path M is carried through the middle transportation path M by the upper pressure roller 16*b* and the drive roller 17.

The card reversing path 21 is demarcated by straight guides 21*a* and 21*b* disposed extending in line from the left side of the middle transportation path M as shown in FIG. 3. Reversing transportation rollers 22 are disposed near the end portion 21*c* of the card reversing path 21. The reversing transportation rollers 22 convey the card C from the middle transportation path M until a certain length of the card C hangs over the end portion 21*c* of the card reversing path 21, and then conveys the card C back into the middle transportation path M.

A first image scanner 11 and a second image scanner 12 for scanning slips and cards are disposed on the middle transportation path M at offset positions along the transportation direction as shown in FIG. 4. Both the first image scanner 11 and the second image scanner 12 are CIS (contact image sensor) scanners. The first image scanner 11 and the second image scanner 12 each expose one side of the check S or card C travelling through the middle transportation path M to light, detect the light reflected from the check S or card C by means of a photoreceptor array (an array of photoelectric conversion devices), and convert the detected light to electric signals representing one line of the image. A two-dimensional image of the front and back of the medium being scanned is sequentially formed by the first image scanner 11 and the second image scanner 12 sequentially scanning each line of the back and front of the check S or other medium.

A magnetic ink character reading device (MICR) 13 for reading magnetic ink characters is disposed below the drive roller 17. The MICR 13 is a sensor for reading magnetic ink characters printed on the face of the check S. The MICR 13 reads the surface of the check S pressed against the surface of the MICR 13 by a pressure lever disposed opposite the MICR 13 on the other side of the middle transportation path M. In this embodiment of the invention, the MICR 13 is disposed for reading the magnetic ink character recording area containing the checking account number and other information printed in magnetic ink.

As shown in FIG. 2, the carriage 14 is disposed in the straight portion of the paper transportation path P1 between the second transportation rollers 7 and the discharge rollers 8 so that the carriage 14 can move linearly along the paper transportation path P1. A print head 19 having a plurality of nozzles for discharging ink is disposed to the carriage 14. Ink is discharged from the plural nozzles of the print head 19 in response to commands from the host computer 110 to print an endorsement on the check S, to print on validation slips, and to print on roll paper. The mechanism including the carriage 14 and print head 19 used for printing is referred to herein as the print mechanism 15.

The print media processing apparatus 1 according to this embodiment of the invention can switch the printing mode between a so-called stationary paper mode and a stationary print head mode. In the stationary paper mode the check or other print medium is held stationary while the print head 19 prints by moving horizontally over the print medium. In the stationary print head mode, the print head 19 remains stationary and prints while the print medium is moved passed the print head 19. If the ink nozzle array of the print head is longer than the length of one line, the stationary print head mode enables completing printing with a single transportation operation without stopping the print medium.

The paper detectors disposed in the paper transportation path P1 are described next. As shown in FIG. 4, four paper detectors are disposed to the paper transportation path P1, including the ASF detector (paper supply unit detector) 9, TOF (top of form) detector 10, validation slip detector 26, and discharge detector 28. These detectors 9, 10, 26, and 28 are optical paper detectors, for example, rendered to detect the presence of paper in front of the detector.

The ASF detector 9 is disposed near the discharge side end of the ASF 3 to detect a check S delivered from the ASF 3.

The TOF detector 10 is disposed between the ASF 3 and first image scanner 11 for detecting media delivered to the first image scanner 11.

The validation slip detector 26 is disposed in the straight portion on the downstream side of the second transportation rollers 7, and detects if a validation slip is inserted from the validation slip insertion slot 40 and if a check S is conveyed from the middle transportation path M.

The discharge detector 28 is disposed near the paper exit 4 and detects each check S discharged from the paper exit 4.

A card detector 25 for detecting cards C is disposed in the paper transportation path P2. The card detector 25 is located near the card insertion slot 20 for detecting cards C inserted from the card insertion slot 20.

The internal arrangement of a print media processing system 50 according to another aspect of at least one embodiment of the invention is described next with reference to FIG. 5 and FIG. 6.

Figure 5:
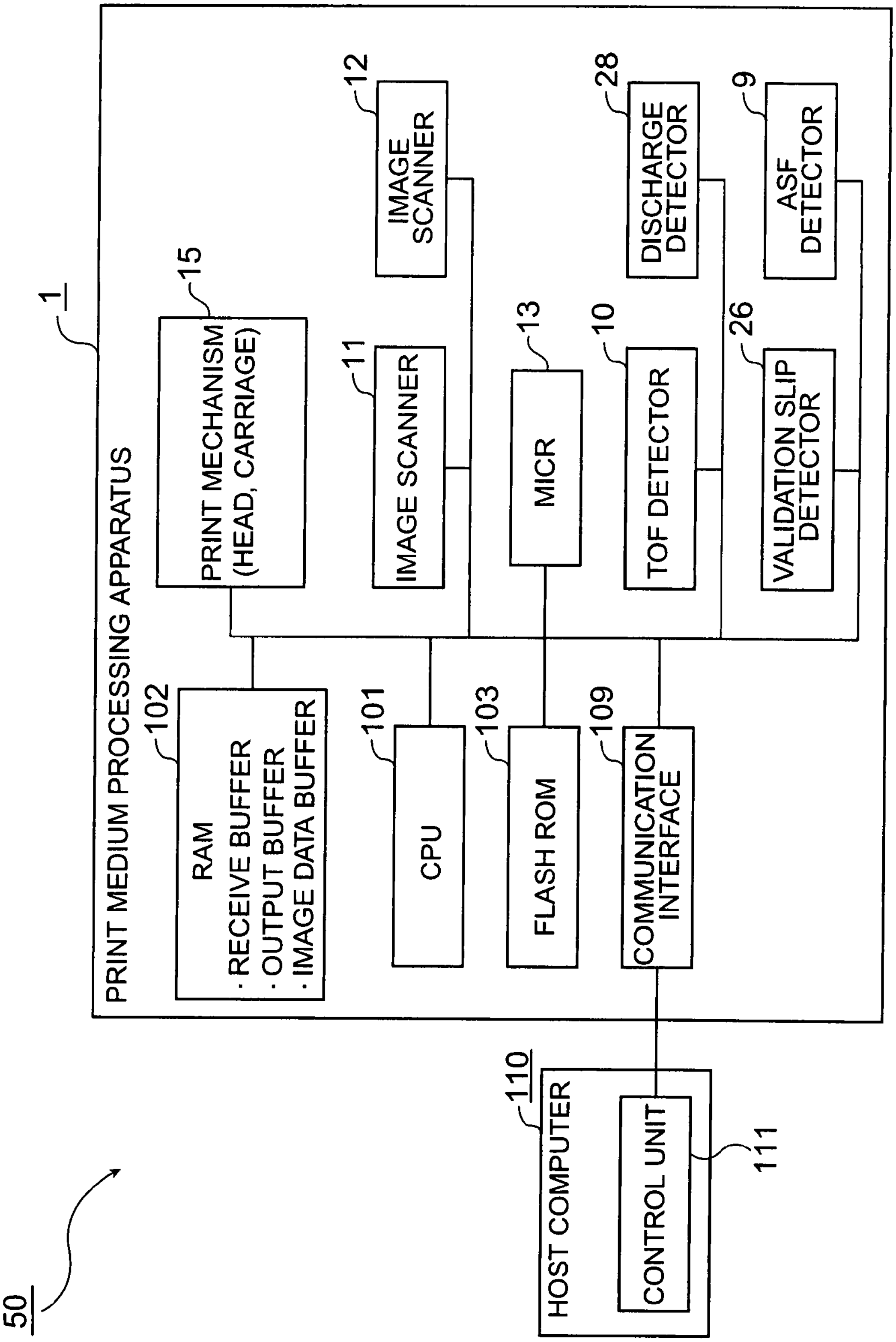
FIG. 5 is a block diagram showing the internal arrangement of a print media processing system according to another aspect of the invention.
Figure 6:
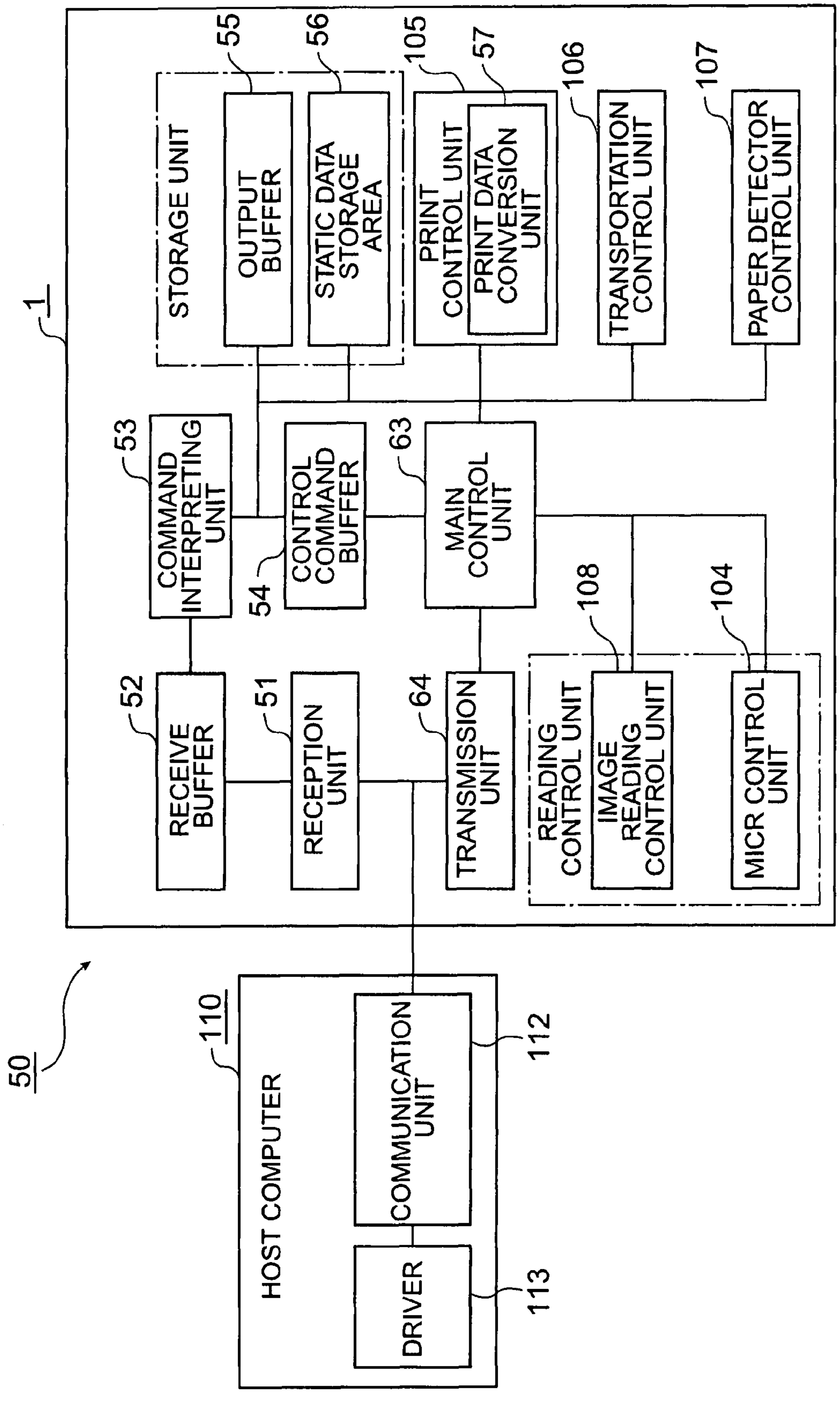
FIG. 6 is a function block diagram describing the internal processes of a print media processing system according to the invention.

FIG. 5 is a block diagram showing the internal arrangement of a print media processing system 50 according to this aspect of the invention, and FIG. 6 is a function block diagram describing the internal processes of the print media processing system 50.

The print media processing system 50 includes a host computer 110 and a print media processing apparatus 1 that is communicably connected to the host computer 110.

The host computer 110 has a control unit 111 and controls general operation of the print media processing system 50. In this aspect of the invention, the control unit 111 interprets magnetic ink character data and image data sent from the print media processing apparatus 1 and determines whether the MICR 13 and image scanners 11 and 12 are operating normally. The control unit 111 generates a command based on the result of this determination and outputs the command to the print media processing apparatus 1.

As shown in FIG. 5 the print media processing apparatus 1 in this embodiment of the invention has a CPU 101, RAM 102, flash ROM 103, and a communication interface 109 interconnected by a bus to enable data communication.

The communication interface 109 is the communication control unit for communicating with the host computer 110, and may be rendered using a USB interface or a serial interface, for example. The communication interface 109 passes commands and data sent from the host computer 110 to RAM 102, and passes status signals (signals indicating the state of the print media processing apparatus 1) generated by the CPU 101, the magnetic ink character data, and image data to the host computer 110.

The CPU 101 is the control center of the print media processing apparatus 1 and controls overall operation of the print media processing apparatus 1 by running firmware stored in flash ROM 103 in response to commands from the host computer 110.

The RAM 102 is volatile memory provided as temporary storage for the print media processing apparatus 1, and functions as a data buffer for CPU 101 operations, a receive buffer for temporarily storing commands and print data sent from the host computer 110, an image data buffer for temporarily storing image data captured by the image scanners 11 and 12 and magnetic ink character data read by the MICR 13, and a print buffer (output buffer) for storing the converted image data for printing.

The flash ROM 103 is rewritable non-volatile memory provided as a data storage area for the print media processing apparatus 1, and primarily stores the firmware run by the CPU 101 and settings for the print media processing apparatus 1. As noted above, the CPU 101 controls the print media processing apparatus 1 by running the firmware stored in this flash ROM 103 using the settings (parameters) stored in the same flash ROM 103.

The internal processes of the print media processing apparatus 1 are described next with reference to FIG. 6. As shown in FIG. 6, the print media processing apparatus 1 has a reception unit 51 and a receive buffer 52. The reception unit 51 receives the commands and print data sent from the host computer 110, and the receive buffer 52 temporarily stores the commands and print data received by the reception unit 51. Data stored by the receive buffer 52 is interpreted by a command interpreting unit 53 which sends control commands to a control command buffer 54 and sends print data to the output buffer 55 by DMA transfer, for example.

The print data temporarily stored in the output buffer 55 is converted in a data conversion process run by the print data conversion unit 57 to dot pattern data conforming to the nozzle array of the print head 19, and is stored to the output buffer 55.

The static data storage area 56 stores common static data that is printed on more than one check S, and when the print data conversion process converts the static data portion of the print data, the converted static data portion is copied to the static data storage area 56. The print data conversion process is further described below.

The print control unit 105 drives the print head 19 based on the dot pattern data stored in the output buffer 55, and prints an endorsement on the back of a check S by printing an image on the check S.

A main control unit 63 reads the control command data temporarily stored in the control command buffer 54 to control the scanning of checks S by means of the image scanners 11 and 12, reading magnetic ink characters by means of the MICR 13, conveying the checks S, and control media detection by means of the paper detectors disposed in the transportation path by means of the image reading control unit 108, the MICR control unit 104, the transportation control unit 106, and the paper detector control unit 107.

Data captured by the image reading control unit 108 and the MICR control unit 104 is sequentially transferred through a transmission unit 64 to the host computer 110, and the control unit 111 of the host computer 110 determines if the data was read correctly.

The MICR control unit 104 is a driver for controlling driving the MICR 13. More specifically, the MICR control unit 104 generates a reading sampling pulse that is output to the MICR 13 in response to commands from the CPU 101, and sends a digital signal representing the magnetic ink characters read by the MICR 13 to the RAM 102. The magnetic ink character data printed on the check S is thus stored in RAM 102. The magnetic ink character data is then sequentially output to the host computer 110 (see FIG. 5), and the control unit 111 determines if the data was read correctly.

The print control unit 105 is a driver for controlling driving of the print mechanism 15 including the carriage 14 and the print head 19. More specifically, the print control unit 105 drives the carriage 14 and print head 19 simultaneously according to the print data to discharge ink from the print head 19 onto the check S, roll paper, or validation slip and print images or text on the print medium.

In this embodiment of the invention the control unit 111 of the host computer 110 determines if the corresponding image areas (the area containing the payee, date, and amount information) of the check S were correctly read by the MICR 13 and the image scanners 11 and 12, and controls the printing operation accordingly.

The transportation control unit 106 is a driver for controlling conveying checks S, cards C, roll paper, and validation slips. To convey a check S, the transportation control unit 106 drives a stepping motor (not shown in the figure) to drive the ASF 3 and transportation rollers 6, 7, 8 and 16 to carry the check S through the paper transportation path P1. To convey a card C, the transportation control unit 106 drives the same stepping motor to drive the middle transportation rollers 16 and reversing transportation rollers 22 to carry the card C through the paper transportation path P2.

The paper detector control unit 107 is a detector driver for driving the ASF detector 9, the TOF detector 10, the validation slip detector 26, the discharge detector 28, and the card detector 25. More specifically, the paper detector control unit 107 produces the media detection sampling pulses that are output to the detectors 9, 10, 25, 26, and 28.

The image reading control unit 108 is an image scanner driver for controlling the first image scanner 11 and the second image scanner 12. More specifically, the image reading control unit 108 outputs a scanning trigger signal to the image scanners 11 and 12, A/D converts and buffers the electric signals output by the photodetectors of the image scanners 11 and 12 line by line, and sends the buffered digital signals for one line to the RAM 102. A two-dimensional image of the check S or card C is thus gradually assembled in RAM 102. The resulting image data is then sent to the host computer 110, and the control unit 111 determines if the image data was correctly read.

The control unit 111 of the host computer 110 includes a communication unit 112 and a driver 113. The read commands (read instructions), start print data conversion commands (print data conversion command), and stop print data conversion commands generated by the driver 113 are output through the communication unit 112 to the print media processing apparatus 1. The read data that is captured in response to a read command and is returned by the transmission unit 64 of the print media processing apparatus 1 is also received by the communication unit 112.

Figure 7:
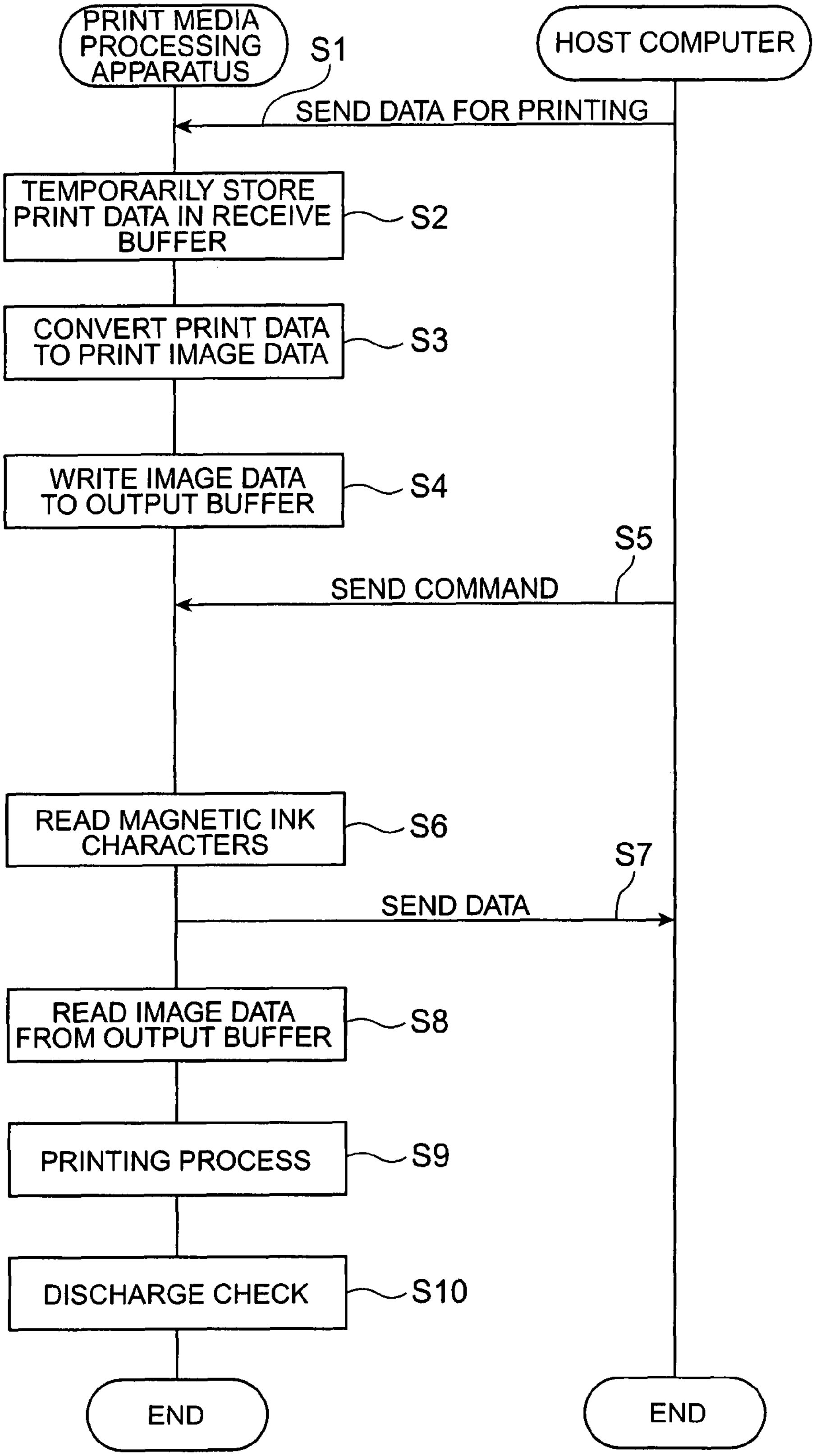
FIG. 7 is a flow chart describing the process for printing a check S in the print media processing system according to the invention.

The process whereby the print media processing system 50 according to this embodiment of the invention prints a check S is described next with reference to FIG. 7 and FIG. 8. FIG. 7 is a flow chart describing the process for printing a check S in the print media processing system 50 according to the invention.

The host computer 110 first sends the print data used for printing a check to the print media processing apparatus 1 (step S1). The print media processing apparatus 1 then temporarily stores the print data received in the receive buffer 52 in the output buffer 55 in the RAM 102 (step S2). The print data conversion unit 57 then reads and converts the print data from the output buffer 55 to print image data (step S3) and writes the print image data to the output buffer 55 (step S4). The converted image data is stored in the output buffer 55. This sequence results in the image data used for printing being prepared in the print media processing apparatus 1 for printing.

When an appropriate command is received from the host computer 110 (step S5), the image reading control unit 108 executes the image scanning process using the image scanners 11 and 12 to scan and image the check S. The MICR control unit 104 also executes the MICR process to drive the MICR 13 and read the magnetic ink characters printed in the magnetic ink character area of the check S (step S6). The read information is sequentially converted to digital signals, and the recognition result from the MICR 13 is output as the magnetic ink character data together with the image data to the host computer 110 through the communication interface 109 (step S7).

If a print command is included in the commands sent from the host computer 110 in step S5, the print control unit 105 reads the print image data previously stored in the output buffer 55 after the reading process (step S8) and prints the check S (step S9). When printing ends, the transportation control unit 106 discharges the check S from the paper exit 4 (step S10).

If the host computer 110 sends the print command after the read image and MICR data is sent to the host computer 110, the print media processing apparatus 1 waits to receive the print command before reading the print image data previously stored in the output buffer of the RAM 102 (step S8) and printing by means of the print mechanism 15 (step S9). Printing can be completed more quickly in this case if the printing mode is changed from the stationary paper mode (serial printing) to the stationary print head mode (line printing), and printing proceeds simultaneously with imaging and reading. The printed check is then discharged by suitably controlling the transportation control unit 106 and paper detector control unit 107 (step S10), and the printing job is completed.

Scanning and printing a single check S is described above. The process for continuously scanning and printing a plurality of checks S is described with reference to FIG. 8. FIG. 8 is a flow chart describing the paper transportation process when continuously processing print media.

In addition to the conventional single scanning command, the print media processing apparatus 1 according to this embodiment of the invention adds a continuous scanning command to the magnetic ink character reading process to continuously scan checks until there are no checks S left in the ASF 3. Continuously reading the checks S enables high speed check processing. The host computer 110 can also selectively use the single slip scanning command (emphasizing check processing reliability) and the continuous scanning command (emphasizing check processing speed) according to the conditions.

After receiving the print data setup command (step S26), interrupt parameter configuration command (step S27), and continuous scanning command (including the type of scanning operation) (step S28) from the host computer 110, the print media processing apparatus 1 executes the image scanning process and magnetic ink character reading process (step S21) and the printing process (step S22), and then returns the requested data from the scanned data to the host computer 110 (step S29). If there is still another check S to be processed and a cause for interrupting operation is not detected (step S23 returns Yes), the scanned slip is discharged while simultaneously feeding the next slip for processing (step S25), and the scanning process repeats. If processing does not continue (step S23 returns No), the slip is discharged (step S24) and a termination status signal is returned to the host computer (step S30).

Figure 8:
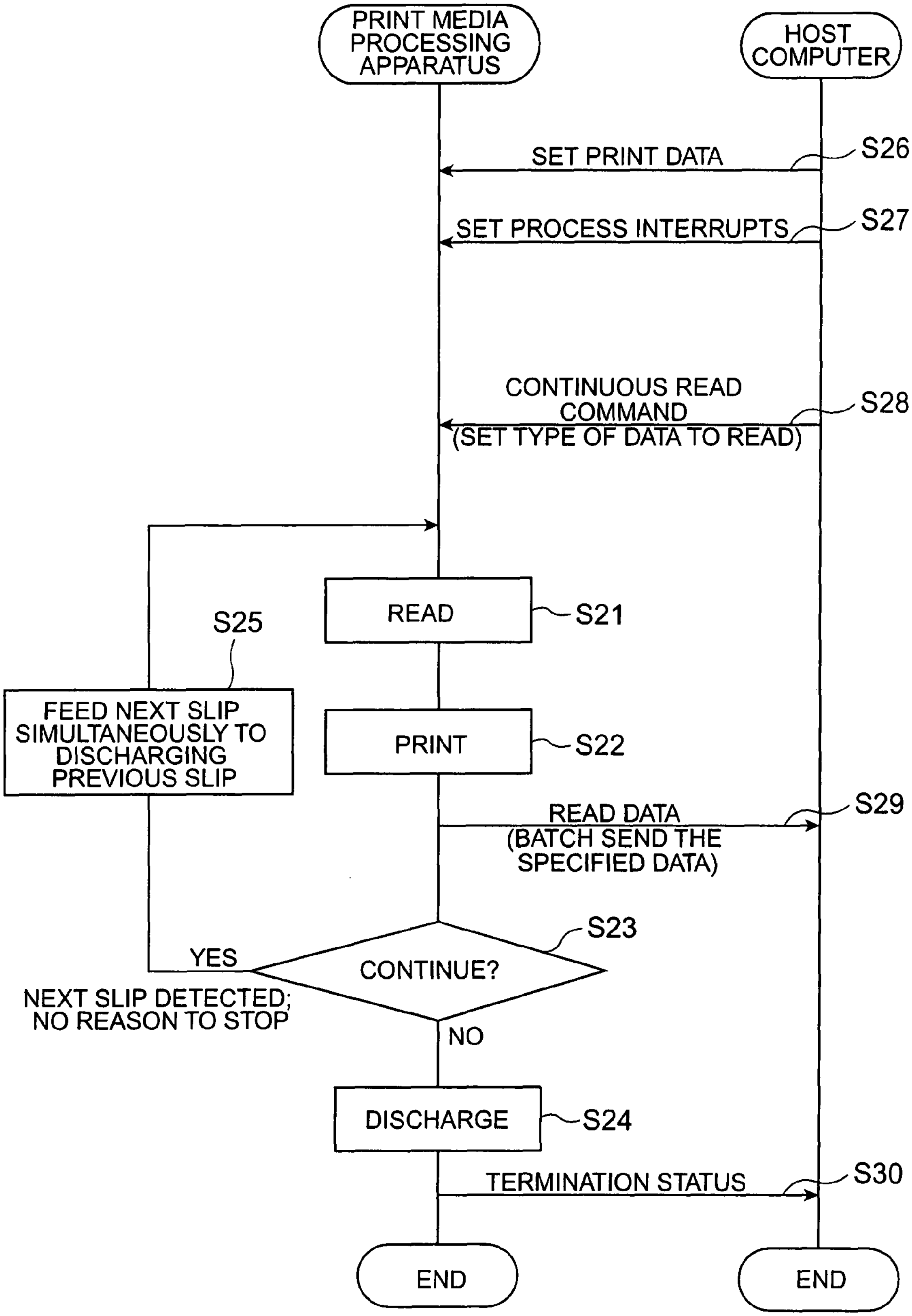
FIG. 8 is a flowchart describing the paper transportation process when continuously processing print media.

This embodiment of the invention executes both the image scanning process and the magnetic ink character reading process when scanning one check S as shown in FIG. 7 and when continuously scanning a plurality of checks S as shown in FIG. 8, but the invention could be arranged to execute only a specific operation. The host computer 110 could, for example, specify the type of scanning operation (imaging, imaging and magnetic ink character reading, or imaging and MICR position information) so that the print media processing apparatus 1 executes only the specified operation and returns the corresponding data to the host computer 110. However, if the specified scanning operation is to send the MICR position to the host computer when it would be meaningless to return the MICR position information (such as when the scanning operation does not include magnetic ink characters and images, or MICR fails), the MICR position information is not returned to the host computer. By specifying a particular type of scanning operation so that only the required information is captured from the check S, unnecessary scanning operations are eliminated and faster processing is possible.

When continuously processing media as shown in FIG. 8, faster throughput can be achieved by eliminating the data transmission handshake and controlling the print media processing apparatus 1 to unilaterally output data to the host computer 110. This, however, requires the host computer 110 to wait for data from the print media processing apparatus 1 after sending commands. So that the host computer 110 knows when to stop waiting for data, the print media processing apparatus 1 outputs a termination status signal when the continuous scanning operation ends.

Discharging one check and feeding the next check proceed as parallel operations in the print media processing apparatus 1 according to this embodiment of the invention. However, whether to continue the continuous media processing operation or scan the next check when an error occurs can be determined in advance. Such errors may include detecting a double feed, being unable to detect a magnetic waveform, the number of unrecognizable characters exceeding the allowed limit in the magnetic signal interpreting process, or exceeding the noise threshold. If a cancel command is sent to the print media processing apparatus 1 while continuously processing checks as described above, the continuous processing operation can be interrupted. Processing any check S for which processing had already started at this time is completed before the operation is cancelled.

The print media processing apparatus according to this embodiment of the invention is thus arranged so that print data is supplied to the print media processing apparatus 1 from the host computer and the print data is converted for printing before printing starts. The print image data can therefore be read immediately from memory when printing starts, and the printing process can be accelerated.

Figure 9:
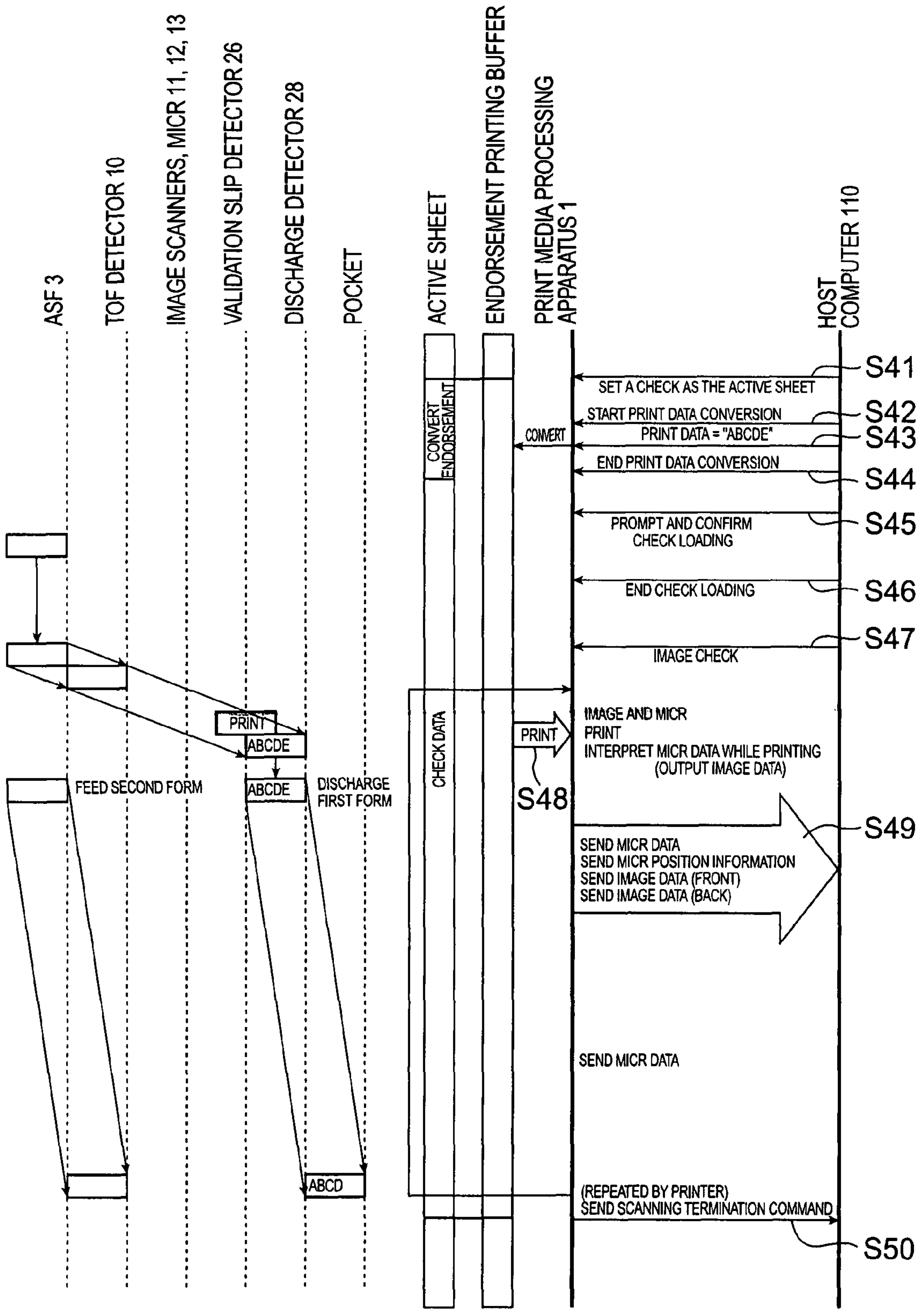
FIG. 9 is a flow diagram describing the processes for continuously scanning and printing checks.

The processes for continuously scanning and printing checks S described above are described in further detail next with reference to FIG. 9. FIG. 9 is a flow diagram describing the processes for continuously scanning and printing checks.

As shown in FIG. 9, when the ASF detector 9 of the print media processing apparatus 1 detects that multiple checks S are stocked in the ASF 3, one check S is delivered to the image scanners 11 and 12 and MICR 13 for reading and the print control unit 105 starts printing an endorsement on the check S when the check S reaches the print head 19. The carriage 14 at this time is stationary and the endorsement is printed at a printing speed corresponding to the feed rate of the check S in a line printing operation. When reading and printing an endorsement on one check S ends, transportation of the check S also pauses. If the ASF detector 9 detects a second check S, the second check S is advanced at the same time the first check S is discharged, the second check S is processed by the image scanners 11 and 12 and MICR 13 in the same way as the first check S, and the print control unit 105 starts endorsement printing on the check S when the check S passes the print head 19. If the ASF detector 9 does not detect another check in the ASF 3 when conveying of this second check S stops, the paused check S is discharged and the continuous processing operation ends.

Communication between the host computer 110 and print media processing apparatus 1 is described next.

When the user selects continuous check S processing (which is done by selecting checks as the active sheet), a start print data conversion command is output through the communication unit 112 to the print media processing apparatus 1 (step S41, step S42). The endorsement print data to be printed is then sent, the print data conversion unit 57 converts the endorsement print data into the output buffer 55, and conversion ends when the stop print data conversion command is received (step S43, step S44).

The continuous scanning process and printing process can run as parallel operations by thus sending the endorsement print data from the host computer 110 and writing the converted print data to the output buffer 55 before executing the image scanning and MICR processes. Compared with the conventional method of individually sending the data read from each check S to the host computer 110, verifying if the data was read correctly, and then sending the print data to the print media processing apparatus 1 for the printing process, the invention enables faster processing because the same print data sent to the print media processing apparatus 1 at the beginning of operation is used to print an endorsement on a plurality of checks S regardless of the result of the scanning operation.

When the conversion of the endorsement print data is finished, the multiple checks S to be scanned are inserted to the ASF 3 in response to an insertion setup command from the host computer 110. When the ASF detector 9 then detects that a check S is inserted, an insertion ready command is returned, and the image scanning and magnetic ink character reading process starts when the read command is received (step S45, step S46, step S47). When the check S reaches the print head 19, the print control unit 105 starts printing the endorsement on the check S (step S48). The image reading control unit 108 and MICR control unit 104 sequentially output the read data to the host computer 110, and the host computer 110 interprets the read data (step S49). When all checks S in the ASF 3 have been scanned, the print media processing apparatus 1 sends a scanning termination command to the host computer 110 (step S50).

The process for converting the endorsement print data printed on the back of the checks S is described next with reference to FIG. 10 and FIG. 11. FIG. 10 is a transition diagram showing writing of the endorsement print data to the output buffer 55. FIG. 11 is a flow chart describing the endorsement print data conversion process.

The endorsement print data conversion process starts when a start conversion command is received from the host computer 110 and ends when a stop conversion command is received (step S42 and step S44 in FIG. 9).

In this example, the print data printed in the static data portion of the endorsement print data is "ABCDE BANK," the value of a counter is the print data printed in the variable data portion, the counter reading is inserted after the "ABC" portion of the static data, and the remaining "DE BANK" portion of the static data is inserted after the variable data.

Configurable counter parameters include the initial count, the number of digits in the count, and the increment or decrement value. In this example the initial count is set to 00011, the number of digits is five, and the increment or decrement is +1. The format of the count can also be defined, and in this aspect of the invention can be set to be right justified with spaces added to the left of the count, zero fill with zeroes inserted to the left of the count, or left justified with spaces added to the right of the count. Zero fill is used in this example.

Figures 10A, 10B, 10C, 10D, 10E, 10F, 10G:
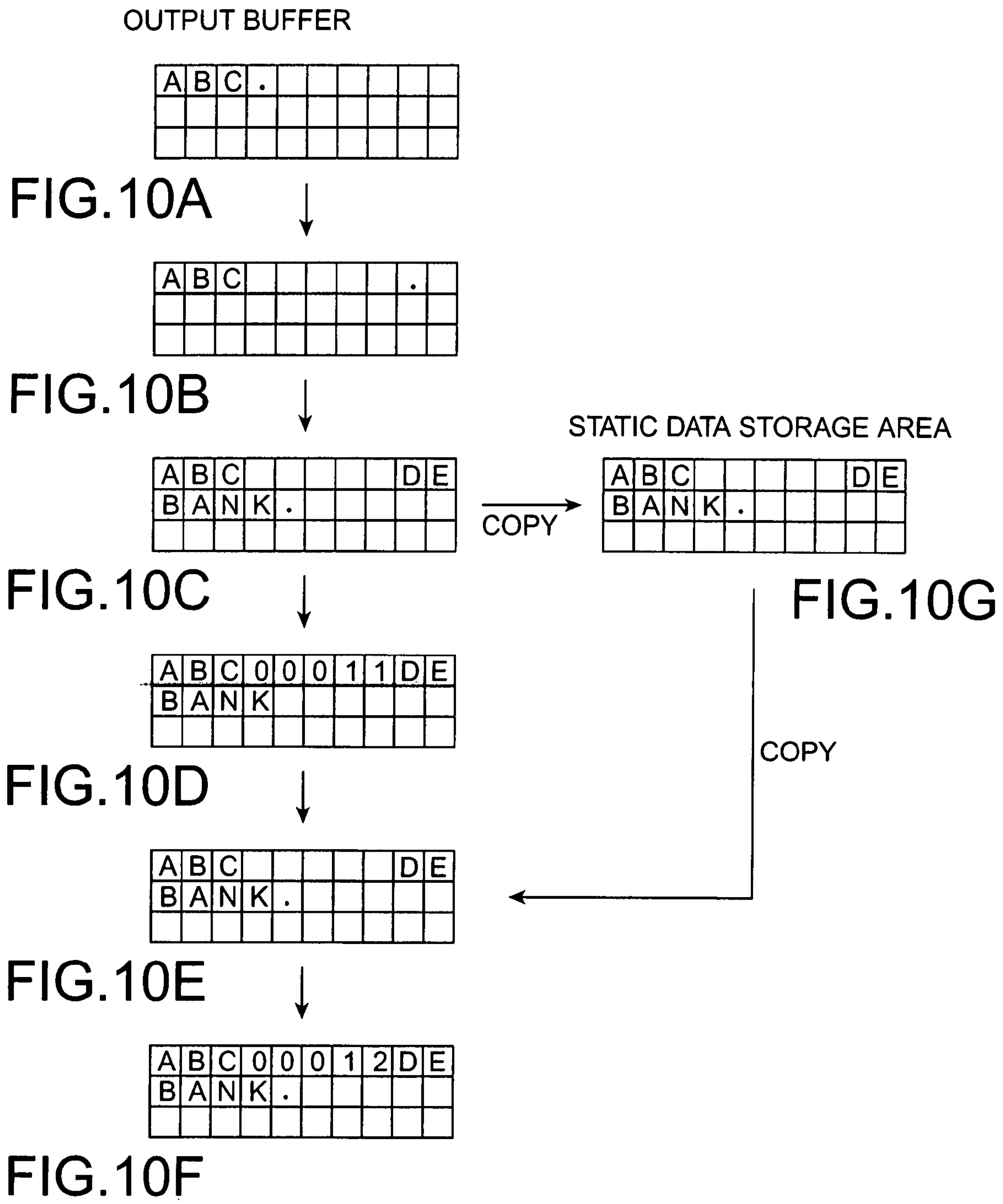
FIG. 10 is a transition diagram showing writing the endorsement print data to the output buffer.
Figure 11:
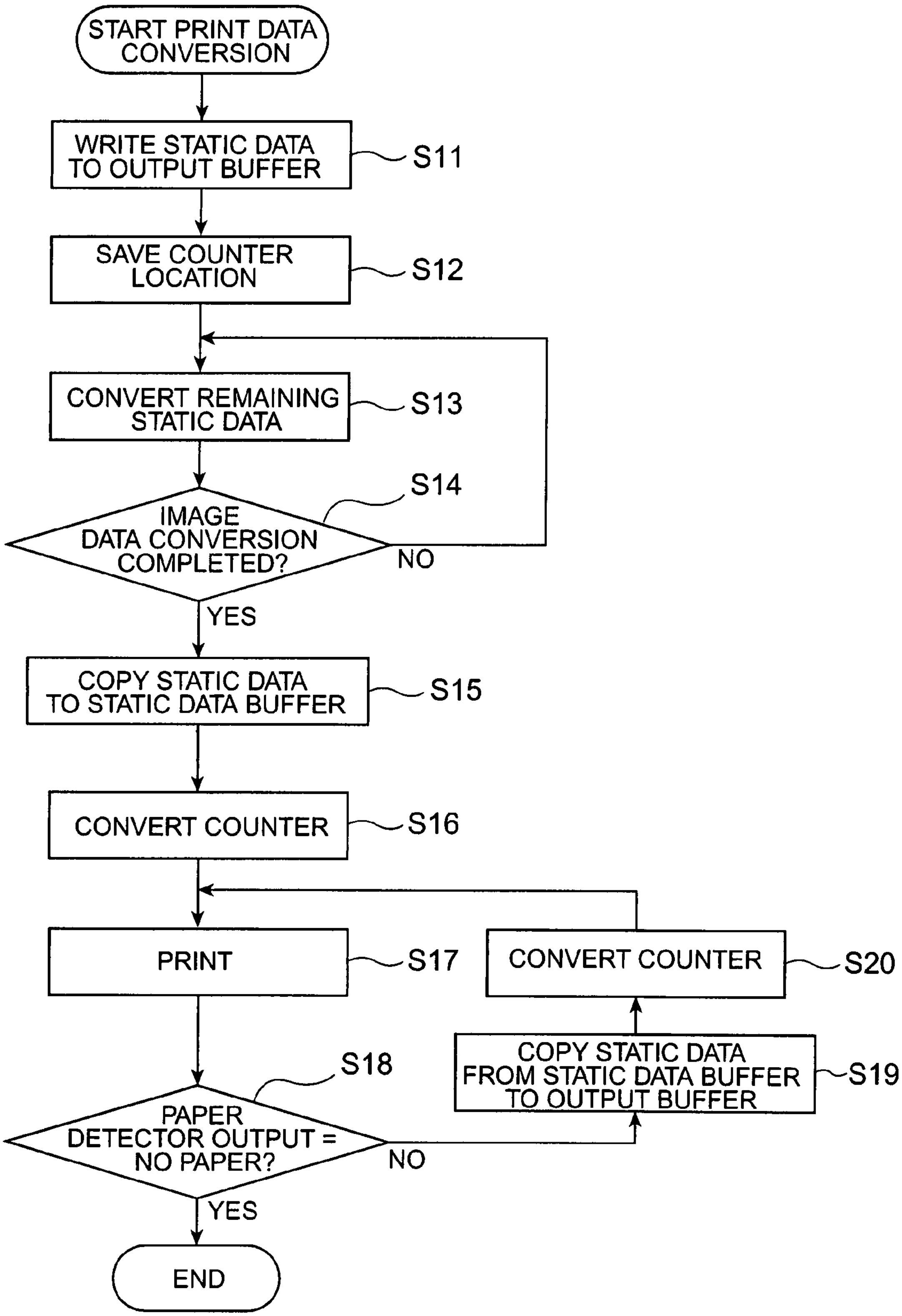
FIG. 11 is a flow chart describing the endorsement print data conversion process.

The "ABC" portion of the static data is first converted and written to the output buffer 55 when the start conversion command is received from the host computer 110 (see step S11 in FIG. 11, and FIG. 10A). Note that the periods in FIGS. 10A-10G indicate the position where the next converted print data is written. The current conversion position (before converting the value from the counter) is then stored. More specifically, the size of one digit in the count is calculated from the current print settings (including the font, size, space to the right of an ANK character, rotation), and the position leaving a space equal to five digits is set as the position where the next converted print data is written (see step S12 in FIG. 11, and FIG. 10B). The remaining static data, "DE BANK," is then converted and written from this position (see step S13 in FIG. 11, and FIG. 10C).

When the stop conversion command is then received from the host computer 110, converting the static data part of the endorsement data ends, and the converted static data is copied to the static data storage area 56 (see step S14, Yes; step S15 in FIG. 11, and FIG. 10G). The count "00011" is then overwritten to the spaces left in FIG. 10C (see step S16 in FIG. 11, and FIG. 10D). When the first check S passes the print head 19, the endorsement print data shown in FIG. 10D is printed on the back of the first check S (see step S17 in FIG. 11).

The second check S is advanced simultaneously with discharging of the first check S (the ASF detector 9 detects another slip and step S18 returns No), and the constant data copied to the static data storage area 56 in step S15 is copied back to the output buffer 55 (see step S19 in FIG. 11, and FIG. 10E). The next count ("00012" in this example) is then overwritten to the variable data portion as described in step S16 (step S20 in FIG. 11, and FIG. 10F). Steps S17 to S20 thereafter repeat until the ASF detector 9 no longer detects a check S in the ASF 3.

The print data conversion process of the print media processing apparatus 1 according to this embodiment of the invention thus divides the endorsement print data into a static data portion that is printed on every check S, and a variable data portion that differs on each check. A different unique endorsement can therefore be printed on each check processed by the image scanners 11 and 12 and MICR 13. This enables printing a sequence number on each of the plural checks S processed in a continuous scanning operation triggered by a single read command. The variable data portion can also be aligned with the static data portion because the variable portion is always inserted to the same predetermined position regardless of the value of the counter.

The counter can also be freely controlled because the initial count and the increment or decrement can be specified as desired. If the read command is asserted multiple times, for example, the format of the count can be changed in each read command so that a non-repeating sequence number can be printed on all checks S processed in response to the multiple read commands.

The static data portion and the variable data portion will also not be printed in an overlapping manner because the number of digits in the count can be specified to reserve enough space to write that number of digits in the variable data portion. The printing format can therefore be controlled to afford a highly legible endorsement because the static data "DE BANK" following the count "00011" can also be printed starting from a constant predetermined position.

Furthermore, because a static data storage area 56 for storing only the static data part of the print data is provided in addition to the output buffer 55 for buffering the endorsement print data that is actually printed, only the print data that is actually printed on a single check S is temporarily stored in the output buffer 55 even if numerous checks S are processed by a single read command, and the invention can therefore be used in print media processing apparatuses having limited storage capacity.

Figure 13:
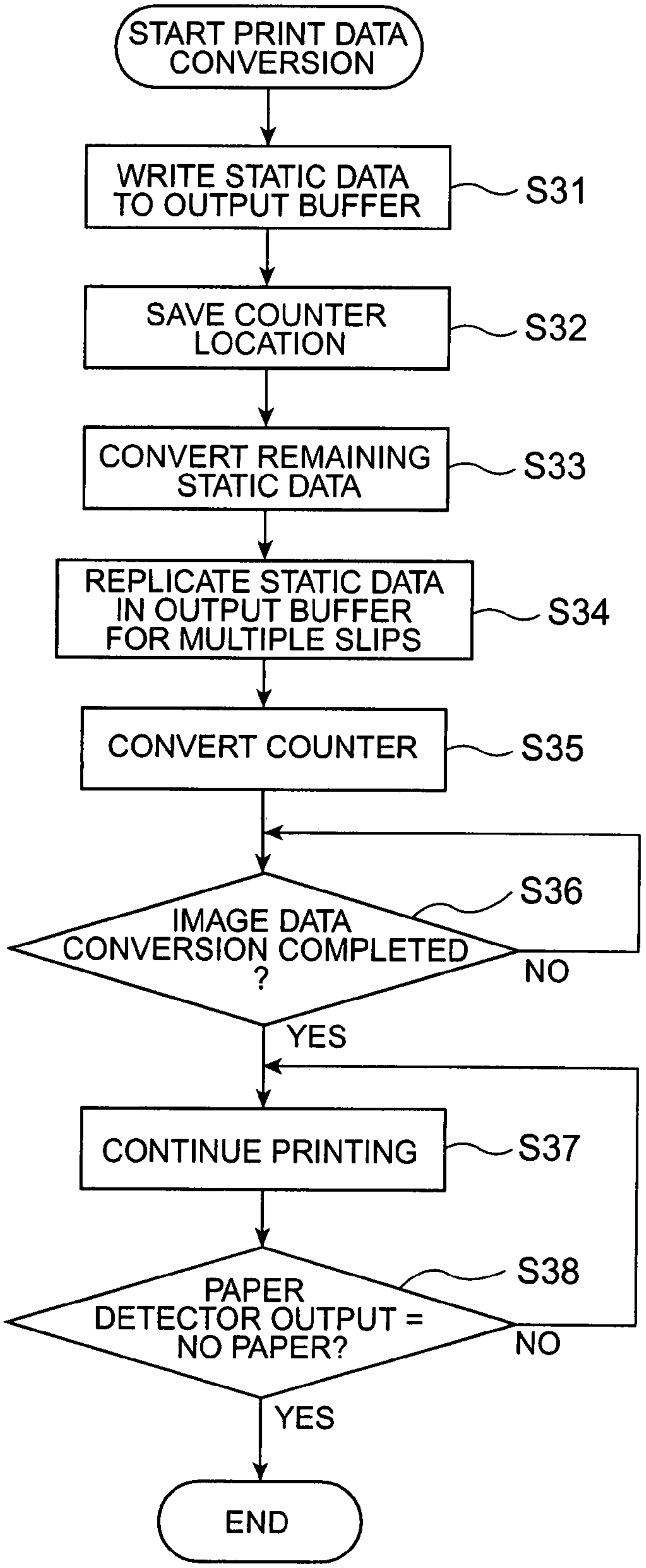
FIG. 13 is a flow chart describing a variation of the endorsement print data conversion process.
Figure 14:
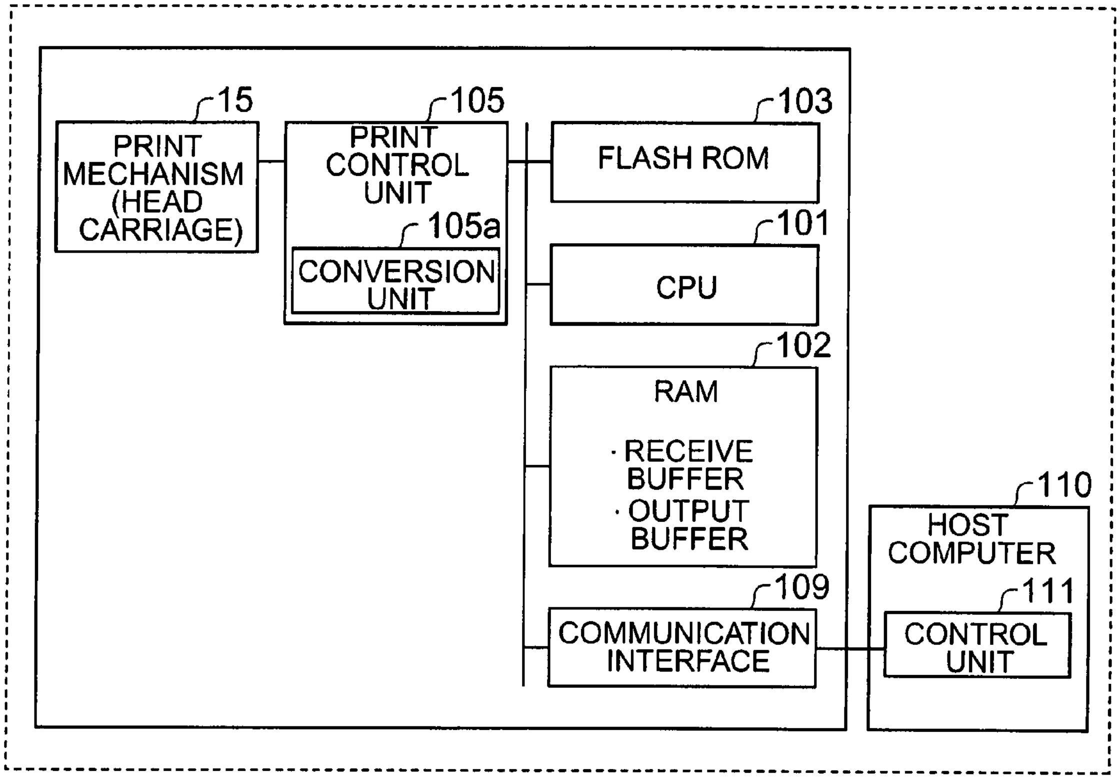
FIG. 14 is a control block diagram of a print media processing apparatus according to the related art.
Figure 15:
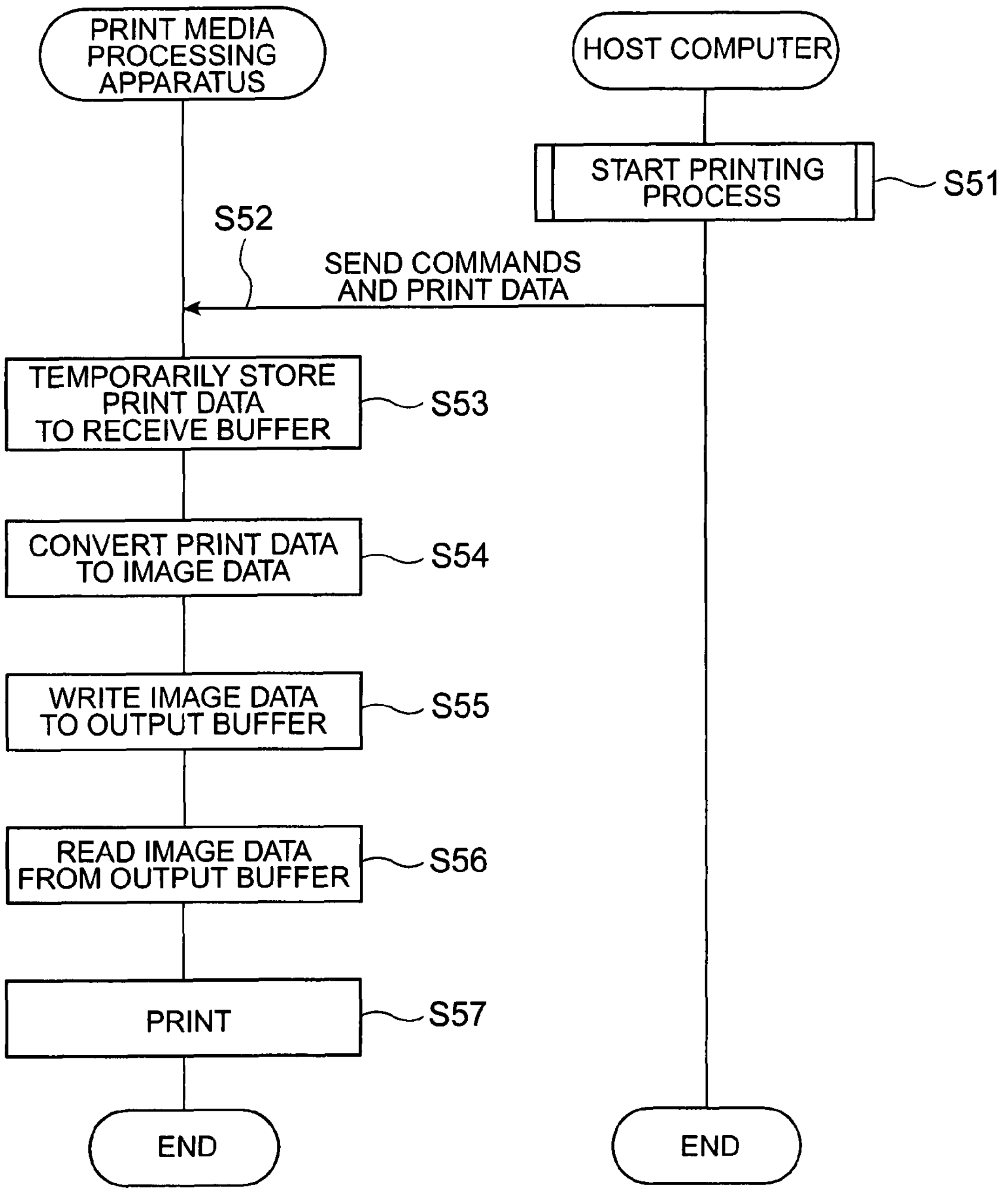
FIG. 15 is a flow chart describing the printing process of a print media processing apparatus according to the related art.

A variation of the above print data conversion process is described next with reference to FIG. 12 and FIG. 13. FIG. 12 is a transition diagram showing another example of writing the endorsement print data to the output buffer. FIG. 13 is a flow chart describing a variation of the endorsement print data conversion process. The static data part and the variable data part of the print data are the same in this variation as in the example described above.

The static data "ABC" is first written to the output buffer 55 when the start conversion command is received from the host computer 110 (step S31). The current conversion position (before converting the value from the counter) is then stored. More specifically, the size of one digit in the count is calculated from the current print settings (including the font, size, space to the right of an ANK character, rotation), and the position leaving a space equal to five digits is set as the position where the next converted print data is written (step S32). The remaining static data, "DE BANK," is then converted and written from this position (step S33).

The static data is then written to the output buffer 55 for a plurality of checks, and the count "00011" to "00015" written to each check is overwritten to the reserved variable data block (see steps S34 and S35 in FIG. 13, and FIG. 12A to FIG. 12E). As shown in FIGS. 12A-12E, endorsement print data for five checks S is thus written to the output buffer 55 and the count (00011 to 00015) written to the variable data part is different in each endorsement.

When the stop conversion command is then received from the host computer 110, the print data conversion process ends (step S36 returns Yes), and the first check S passes the print head 19, the endorsement print data shown in FIG. 12A is printed on the back of the first check S (step S37).

Steps S37 and S38 thereafter repeat until the ASF detector 9 no longer detects a check S in the ASF 3 (step S38 returns Yes), and the print data shown in FIG. 12B to FIG. 12E is sequentially printed on the remaining four checks S.

This aspect of this variation of the invention thus writes endorsement print data to the output buffer 55 for each of the plural checks S that are scanned by a single read command. A faster printing process is therefore possible because print data containing the variable data part that is actually printed is written to the output buffer 55 before printing starts. The invention can thus be advantageously used in print media processing apparatuses for which high speed printing is a priority, and when the number of checks S processed by a single read command is small.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for a print media processing apparatus, comprising:

receiving print data from a host computer;

converting the received print data to print image data;

storing the converted print image data in a buffer;

after conversion of the received print data is finished, for each print medium of a plurality of print media to be read and printed, receiving the print medium having information recorded in magnetic ink to be read and printed from a print medium supply unit;

after receiving the print medium, receiving a command from the host computer for reading the information recorded in the magnetic ink and printing the print data on the print medium; and in response to the command, reading the information recorded in the magnetic ink, reading the print image data from the buffer, and priming the print image data on the print medium.

2. The method of claim 1, further comprising:

receiving a scanning command from the host computer for scanning the print medium, scanning the print medium; and sending scanned data to the host computer.

3. The method of claim 1, further comprising:

selecting a stationary paper mode or a stationary print head mode; and printing by discharging ink from a stationary print head while conveying the print medium past the stationary print head when the stationary print head mode is selected.

4. The method of claim 1, further comprising:

inserting variable data into the print image data before printing the print image data on the print medium.

5. The method of claim 4, wherein the print image data comprises a static data portion and a variable data portion, the static data portion is a portion of the print image data converted from the received print data, and the variable data portion is the inserted variable data.

6. The method of claim 5, wherein the same static data portion is printed on each of the plurality of print media, and the variable data portion differs on each of the plurality of print media.

7. The method of claim 5, wherein the variable data portion comprises a number of digits in a count.

8. A print media processing apparatus, comprising:

a print data conversion unit that converts print data received from a host computer into print image data;

a buffer that stores the converted print image data;

a print medium supply unit in which a plurality of print media having information recorded in magnetic ink is inserted;

a detector that detects the plurality of print media inserted in the print medium supply unit;

a magnetic ink character reader that reads the information recorded in magnetic ink on the plurality of print media;

a printing unit that prints the print image data stored in the buffer; and a controller that, for each print medium of the plurality of print media, prints the print image data on the print medium after insertion of the print medium is detected by the detector and after conversion of the print data by the print data conversion unit is finished.

9. The print media processing apparatus described in claim 8, wherein the print data conversion unit inserts a variable data portion into the print image data.

* * * * *